(12) United States Patent
Bumgardner et al.

(10) Patent No.: US 9,435,636 B1
(45) Date of Patent: Sep. 6, 2016

(54) SYSTEM AND METHOD FOR ESTABLISHING FASTENER LENGTH REQUIREMENTS OR WASHER NUMBER AND SIZING REQUIREMENTS IN HARDWARE INSTALLATIONS

(75) Inventors: Mark D. Bumgardner, Enumclaw, WA (US); Charles M. Richards, Kent, WA (US); Christopher M. Gorsh, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 603 days.

(21) Appl. No.: 13/594,437

(22) Filed: Aug. 24, 2012

(51) Int. Cl.
*G01B 5/18* (2006.01)
*G01B 11/02* (2006.01)

(52) U.S. Cl.
CPC ............... *G01B 11/02* (2013.01); *G01B 5/18* (2013.01)

(58) Field of Classification Search
CPC ...................................................... G01B 11/02
USPC ................. 702/158; 33/836, 806; 29/407.01
See application file for complete search history.

(56) References Cited

U.S. PATENT DOCUMENTS

| 4,216,585 | A | * | 8/1980 | Hatter | 33/836 |
| 4,237,612 | A | * | 12/1980 | Christian et al. | 33/784 |
| 7,665,221 | B2 | * | 2/2010 | Bennison et al. | 33/544 |
| 7,765,712 | B2 | * | 8/2010 | Stockman | 33/784 |
| 7,913,414 | B2 | | 3/2011 | Bumgardner et al. | |
| 8,606,540 | B2 | | 12/2013 | Haisty et al. | |
| 9,157,735 | B2 | | 10/2015 | Haisty et al. | |
| 2006/0032069 | A1 | * | 2/2006 | Jensen et al. | 33/645 |
| 2011/0166824 | A1 | * | 7/2011 | Haisty et al. | 702/157 |
| 2012/0151788 | A1 | * | 6/2012 | Miller et al. | 33/701 |

* cited by examiner

*Primary Examiner* — Huan Tran
(74) *Attorney, Agent, or Firm* — Patterson + Sheridan, LLP

(57) ABSTRACT

A computer-readable storage medium stores instructions executable by a processor to determine, based on information comprising a length measurement from a beginning of a hole on a first side of a structure to either a second side of the structure at which the hole ends or to a portion of a fastener nut disposed on the second side of the structure over the hole, at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener; or a washer thickness to be used with the fastener.

6 Claims, 5 Drawing Sheets

SYSTEM AND METHOD FOR ESTABLISHING FASTENER LENGTH REQUIREMENTS OR WASHER NUMBER AND SIZING REQUIREMENTS IN HARDWARE INSTALLATIONS

FIELD OF THE DISCLOSURE

This disclosure relates to a system and method for providing installation information regarding the required fastener or washer during fastener installation. More particularly, this disclosure relates to a system and method for translating a measured distance into a bolt length, number of washers required, or washer thickness required for a hardware installation.

BACKGROUND

Varying measuring devices exist for attempting to determine fastener length requirements for fastener installations. Some of these devices are manually operated. This may cause user fatigue. Other devices may only output a single reading which requires the user to mathematically convert the single reading into a fastener length and then subjectively determine if washers are required as well as their sizing requirements. This is burdensome for the user and may lead to non-conforming installations.

A system and method for providing installation information during installation of a fastener is needed to overcome one or more of the issues of the existing systems and methods.

SUMMARY

In one embodiment, a computer-readable storage medium is disclosed that stores instructions executable by one or more processors. The computer-readable storage medium includes instructions which determine, based on information comprising a length measurement from a beginning of a hole on a first side of a structure to either a second side of the structure at which the hole ends or to a portion of a fastener nut disposed on the second side of the structure over the hole, at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener when the fastener is installed into the hole of the structure; or a washer thickness for one or more washers to be used with the fastener when the fastener is installed into the hole of the structure.

In another embodiment, a system is disclosed which includes one or more processors and a computer-readable storage medium. The computer-readable storage medium has stored therein instructions that are executable by the one or more processors to determine, based on information comprising a length measurement from a beginning of a hole on a first side of a structure to either a second side of the structure at which the hole ends or to a portion of a fastener nut disposed on the second side of the structure over the hole, at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener when the fastener is installed into the hole of the structure; or a washer thickness for one or more washers to be used with the fastener when the fastener is installed into the hole of the structure.

In still another embodiment, a method is disclosed of determining installation information before installing a fastener into a hole of a structure. In one step, information is received, comprising a length measurement from a beginning of a hole on a first side of a structure to either a second side of the structure at which the hole ends or to a portion of a fastener nut disposed on the second side of the structure over the hole, with one or more processors. In another step, the information is processed with the one or more processors, using instructions that are executed by the one or more processors, to determine at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener when the fastener is installed into the hole of the structure; or a washer thickness for one or more washers to be used with the fastener when the fastener is installed into the hole of the structure.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
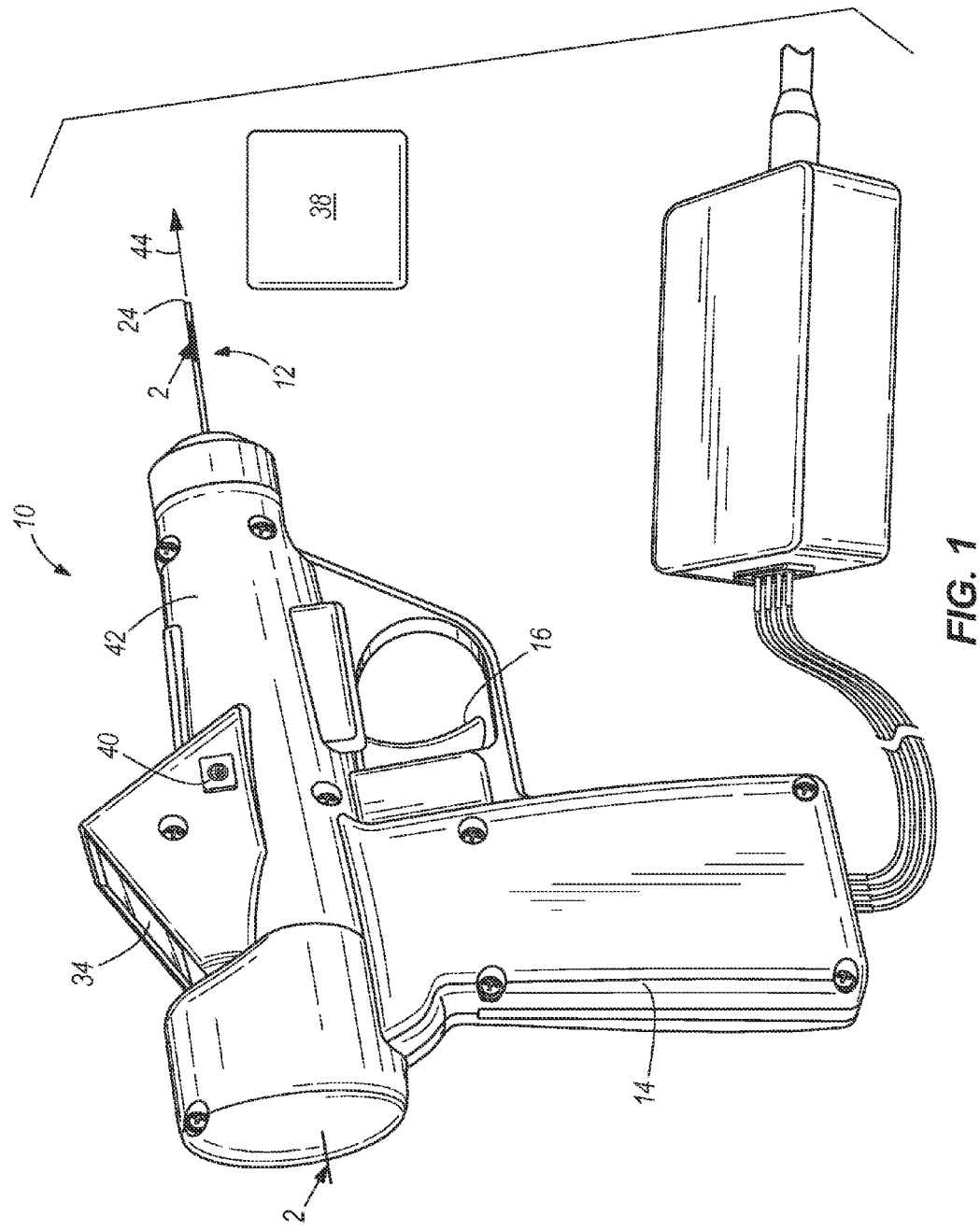
FIG. 1 illustrates a perspective view of one embodiment of a system.
Figure 2:
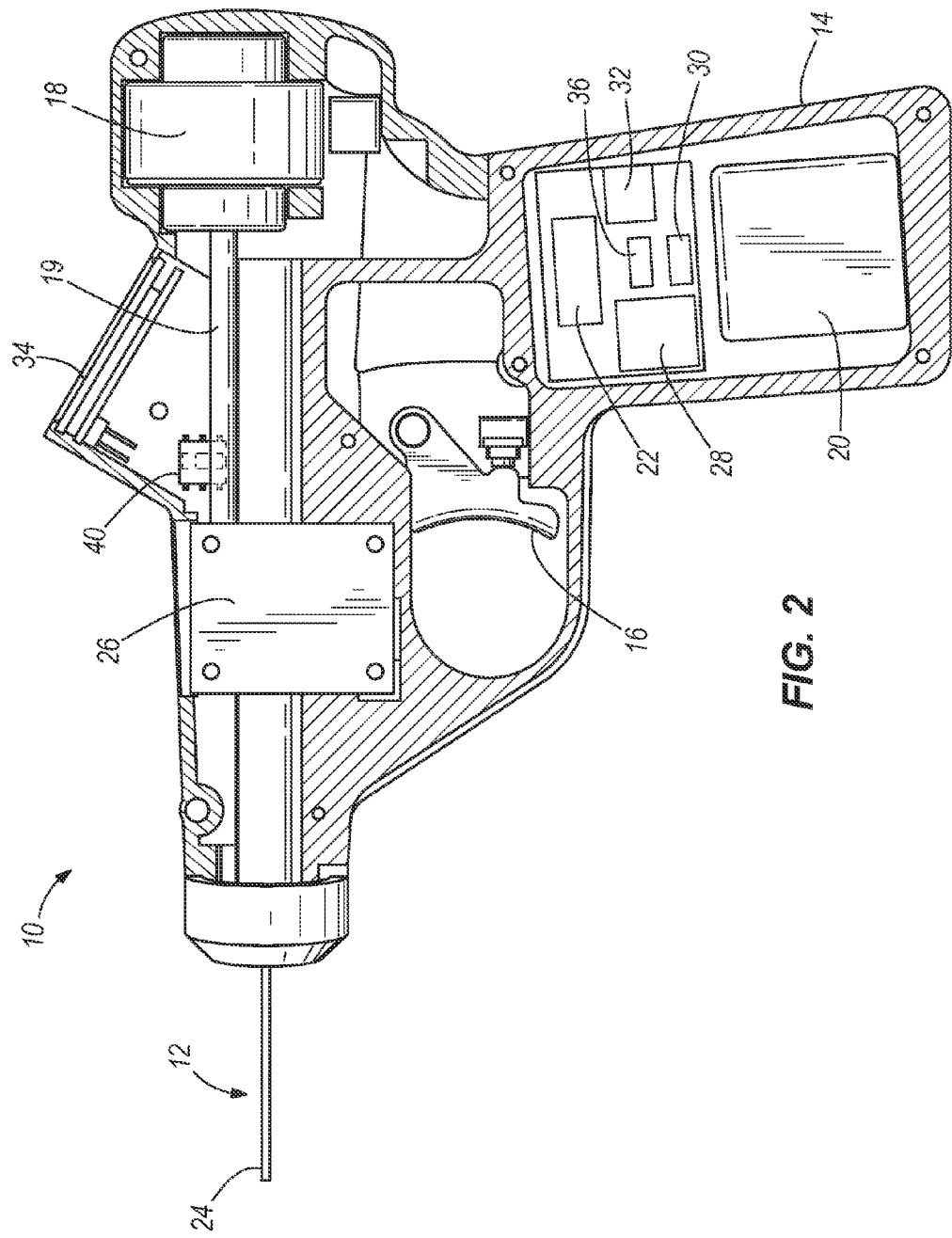
FIG. 2 illustrates a cross-section view through line 2-2 of the system of FIG. 1.

FIG. 1 illustrates a perspective view of one embodiment of a system 10. FIG. 2 illustrates a cross-section view through line 2-2 of the system 10 of FIG. 1. As shown collectively in FIGS. 1 and 2, the system 10 comprises a measuring device 12, a grip 14, a trigger 16, a motor 18, a motor shaft 19, a battery 20, a power supply 22, a moveable measuring member 24, an electronic measurement device 26, a processor 28, a memory 30, a computer-readable storage medium 32, an output device 34, a wireless communication device 36, an external device 38, and a program selector 40. In the embodiment of FIGS. 1 and 2, the components 12, 14, 16, 18, 19, 20, 22, 24, 26, 28, 30, 32, 34, 36, and 40 of the system 10 are held on or in a single housing 42. In other embodiments, the components 12, 14, 16, 18, 19, 20, 22, 24, 26, 28, 30, 32, 34, 36, and 40 of the system 10 may be configured in any number of housings or arrangements. In still other embodiments, the components 12, 14, 16, 18, 19, 20, 22, 24, 26, 28, 30, 32, 34, 36, 38, and 40 of the system 10 may vary in number, position, configuration, or size, one or more of the components may be missing, or one or more additional components may be added.

The measuring device 12 may comprise a hand-held measuring device which a user holds with the grip 14. The trigger 16 is connected to the processor 28. When a user wishes to take a measurement using the measuring device 12, the user may move the trigger 16 to turn on the motor 18. The battery 20 is connected to the power supply 22 which is connected to the motor 18 for electrically powering the motor 18. The battery 20 and the power supply 22 also power the electronic measurement device 26, the processor 28, the output device 34, and the wireless communication device 36. When the motor 18 is turned on the motor shaft 19 connected to the moveable measuring member 24 is moved, using the motor 18, in direction 44 thereby also moving the connected moveable measuring member 24 in direction 44 to take a measurement using the extended moveable measuring member 24. The electronic measurement device 26 takes the measurement of the item being measured when the moveable measuring device 24 is extended. The electronic measurement device 26 may comprise a sensor, an encoder, a linear encoder, or a rotary encoder. The electronic measurement device 26 is connected to the processor 28.

The electronic measurement device 26 determines information, comprising the measurement of the item which was measured using the moveable measuring member 24 of the measuring device 12, and converts the information into an analog or digital signal which it sends to the processor 28. The processor 28 contains a memory 30 having a computer-readable storage medium 32 storing instructions executable by the processor 28. The processor 28 may follow the instructions automatically using at least one predetermined algorithm in order to determine one or more other desired measurement based on the information sent by the electronic measurement device 26. The processor 28 may send the one or more other determined measurement, which were determined by following the instructions, to the output device 34.

The output device 34 may comprise a display, a visual device, an audio device, or another type of output device. The output device 34 may output the one or more other determined measurement to the user. The wireless communication device 36 may be for wirelessly connecting the processor 28 to the external device 38. In such manner, the wireless communication device 36 may allow for the one or more other determined measurement to be wirelessly transmitted to the external device 38 which is disposed external to the system 10. The wireless communication device 36 may comprise a transmitter, a receiver, or a transducer. The external device 38 may comprise any type of device or system disposed external to the system 10 such as one or more additional processors, one or more additional output devices, or other types of devices or systems. The wireless communication device 36 may also allow for the external device 38 to send information to processor 28 through the wireless communication device 36.

The program selector 40 may allow the user to select/determine what one or more other measurement is determined using the processor 28 based on the information sent by the electronic measurement device 26. The program selector 40 may comprise a button, a touch-screen, a moveable member, such as a moveable cap, a moveable knob, a moveable lever, or other type of moveable member, or another type of program selector which when touched, selected, or moved to different positions changes the determination as to what one or more other measurement is determined using the processor 28 based on the information sent by the electronic measurement device 26.

Figure 3:
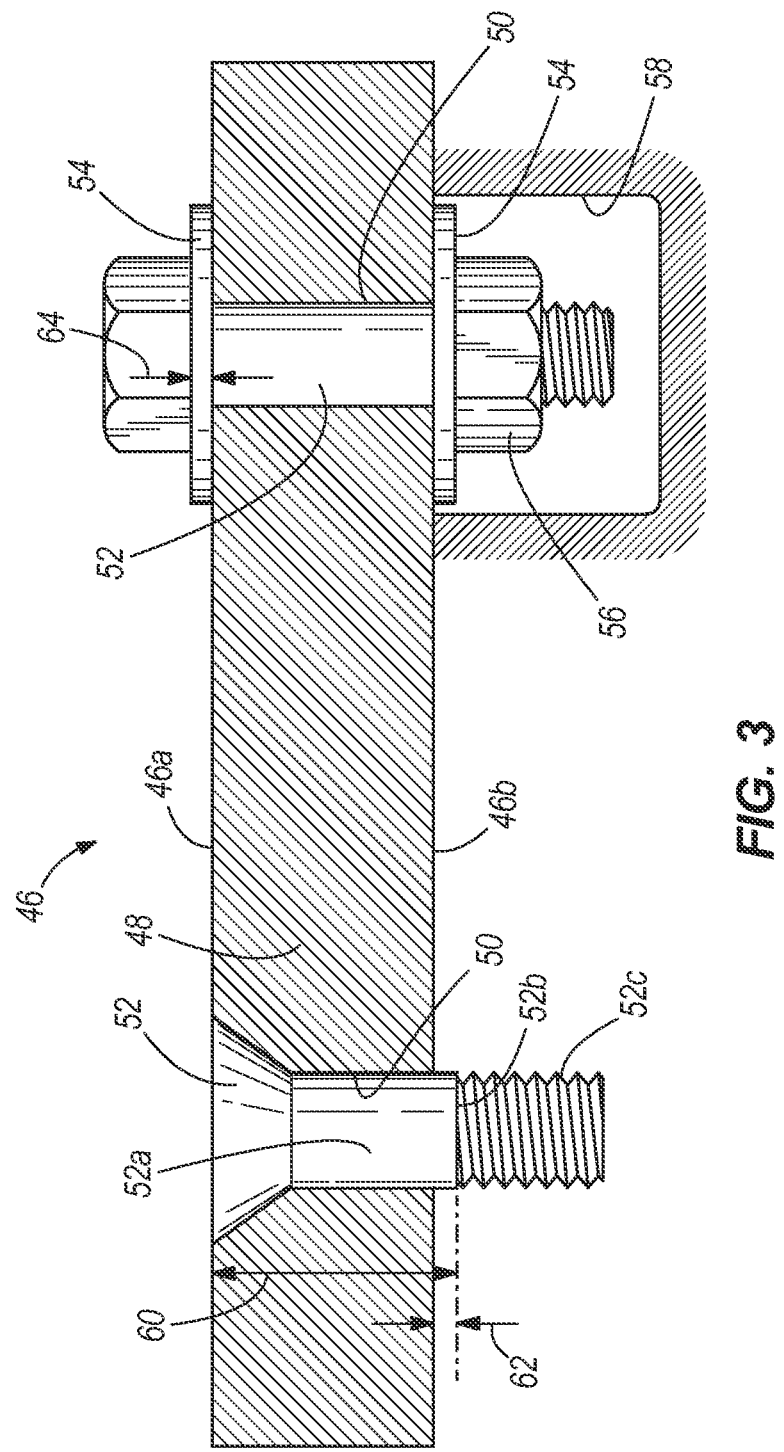
FIG. 3 illustrates a cross-section view through one embodiment of a structure which may be measured using the system of FIGS. 1 and 2.

FIG. 3 illustrates a cross-section view through one embodiment of a structure 46 which may be measured using the system 10 of FIGS. 1 and 2. The structure 46 may comprise one or more stacked layers 48, one or more holes 50 extending from a first side 46a of the structure 46 through a second side 46b of the structure 46, one or more fasteners 52 disposed through the one or more holes 50, one or more washers 54 attached to the one or more fasteners 52, one or more fastener nuts 56 attached to the one or more fasteners 52, and one or more nut housings 58 attached to the one or more stacked layers 48 and disposed over the one or more fastener nuts 56 allowing the one or more fastener nuts 56 to float within the one or more nut housings 58. The fastener length 60 comprises a length of a non-threaded portion 52a of the fastener 52. The thread distance 62 comprises a distance between the second side 46b of the structure 46 and the beginning 52b of a fastener thread 52c when the fastener 52 is installed into the hole 50 of the structure 46. The washer thickness 64 comprises a thickness of the one or more washers 54.

Figure 4:
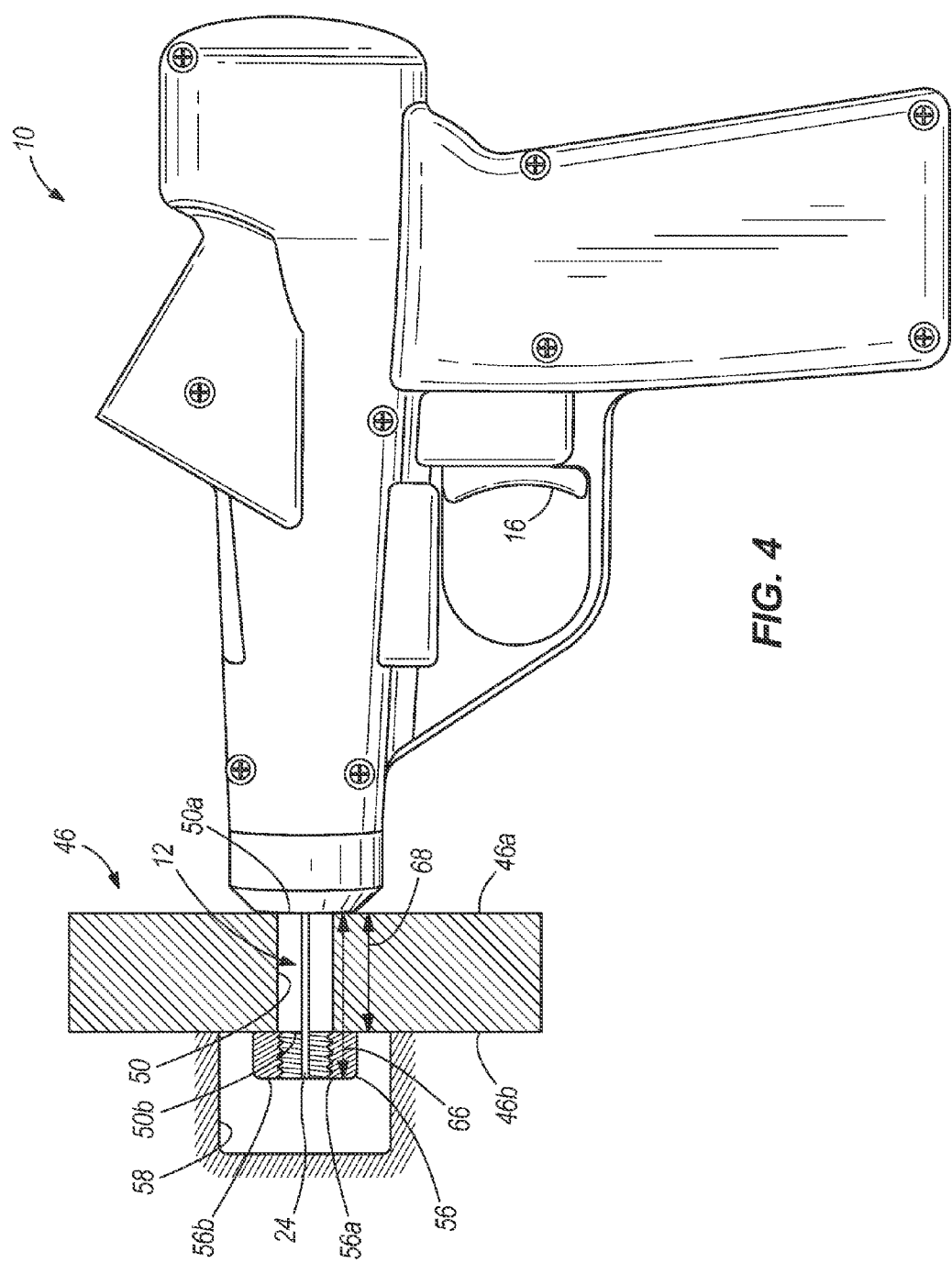
FIG. 4 illustrates a cross-section view through the structure of FIG. 3 with fasteners removed and the system of FIGS. 1 and 2 attached to a hole and a fastener nut of the structure in order to determine installation information before installing fasteners.

FIG. 4 illustrates a cross-section view through the structure 46 of FIG. 3 with the fasteners 52 removed and the system 10 of FIGS. 1 and 2 attached to the hole 50 and the fastener nut 56 of the structure 46 in order to determine installation information before installing the fasteners 52 of FIG. 3. As shown, the moveable measuring member 24 of the measuring device 12 may be extended, after the trigger 16 of the system 10 is triggered by a user, into and through the hole 50 of the structure 46 from the first side 46a of the structure 46 through the second side 46b of the structure 46 and into the fastener nut 56 moving the fastener nut 56 (floating inside the nut housing 58) against the second side 46b of the structure 46. With the moveable measuring member 24 disposed in this position, the system 10 may gather information comprising a length measurement 66 from a beginning 50a of the hole 50 on the first side 46a of the structure 46 to a portion 56a of the fastener nut 56 disposed on the second side 46b of the structure 46. The portion 56a of the fastener nut 56 may comprise an end 56b of the fastener nut 56. In other embodiments, the portion 56a of the fastener nut 56 may comprise any portion of the fastener nut 56. In still other embodiments, the information may comprise a length measurement 68 from the beginning 50a of the hole 50 on the first side 46a of the structure 46 to the end 50b of the hole 50 on the second side 46b of the structure 46. In further embodiments, the information may vary.

The electronic measurement device 26 of FIG. 2 may determine information, comprising the length measurement 66 or the length measurement 68 shown in FIG. 4, or one or more other type of information, and convert the information into an analog or digital signal which it sends to the processor 28 of FIG. 2. The processor 28 may then follow instructions, saved on the memory 30 of the computer-readable storage medium 32 of FIG. 2, to determine using one or more predetermined algorithms at least one of: the fastener length 60 of FIG. 3 comprising a length of a non-threaded portion 52a of a fastener 52 to be installed into the hole 50 of the structure 46; the thread distance 62 of FIG. 3 comprising the distance between the second side 46b of the structure 46 and the beginning 52b of the fastener thread 52c when the fastener 52 is installed into the hole 50 of the structure 46; the number of washers 54 of FIG. 3 to be used with the fastener 52 when the fastener 52 is installed into the hole 50 of the structure 46; the washer thickness 64 of the washers 54 of FIG. 3 to be used with the fastener 52 when the fastener 52 is installed into the hole 50 of the structure 46; or make one or more other type of measurement determination.

The processor 28 of FIG. 2 may send the determined measurements, comprising the fastener length 60, the thread distance 62, the number of washers 54 to be used, the washer thickness 64 to be used for the washers 54, one or more other type of measurement determination, or any combination thereof, to the output device 34. The output device 34 of FIG. 2 may output the determined measurements, comprising the fastener length 60, the thread distance 62, the number of washers 54 to be used, the washer thickness 64 to be used for the washers 54, one or more other type of measurement determination, or any combination thereof, to the user. The wireless communication device 36 of FIG. 2 may wirelessly transmit the determined measurements, comprising the fastener length 60, the thread distance 62, the number of washers 54 to be used, the washer thickness 64 to be used for the washers 54, one or more other type of measurement determination, or any combination thereof, to the external device 38 disposed external to the system 10. The wireless communication device 36 of FIG. 2 may also wirelessly receive information from the external device 38 and send the received information to the processor 28. The program selector 40 of FIG. 2 may allow the user to select/determine which combination of the fastener length 60, the thread distance 62, the number of washers 54 to be used, the washer thickness 64 to be used for the washers 54, one or more other type of measurement determination, or any combination thereof, is determined using the system 10.

In other embodiments, any of the components of the system 10 of FIGS. 1 and 2 may be used with any type of existing or future fastener/fastener installation measuring device in order to determine and output the fastener length 60, the thread distance 62, the number of washers 54 to be used, the washer thickness 64 to be used for the washers 54, one or more other type of measurement determination, or any combination thereof. For instance, some of the components of the system 10 of FIGS. 1 and 2 may be used with U.S. Pat. No. 7,913,414 titled NUT PLATE GRIP GAGE filed on Mar. 18, 2009 and issued on Mar. 29, 2011, which is hereby incorporated by reference in its entirety, in order to determine and output the fastener length 60, the thread distance 62, the number of washers 54 to be used, the washer thickness 64 to be used for the washers 54, one or more other type of measurement determination, or any combination thereof.

Figure 5:
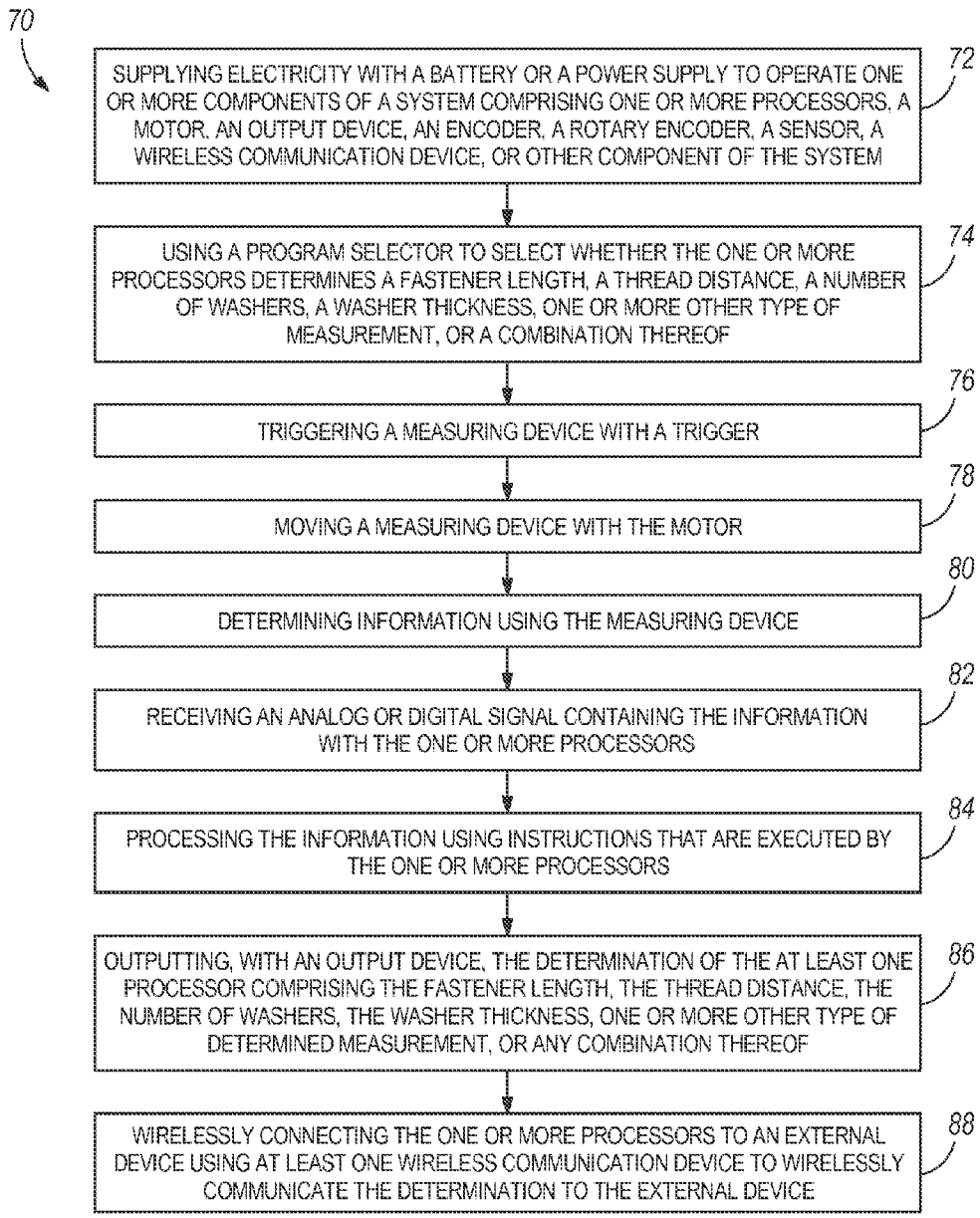
FIG. 5 illustrates a flowchart of one embodiment of a method of determining installation information before installing a fastener into a hole of a structure.

FIG. 5 illustrates a flowchart of one embodiment of a method 70 of determining installation information before installing a fastener into a hole of a structure. The method 70 may use any embodiments of the system 10 disclosed herein. In step 72, electricity is supplied with a battery or a power supply to operate one or more components of a system comprising one or more processors, a motor, an output device, an encoder, a rotary encoder, a sensor, a wireless communication device, or other component of the system. In step 74, a user selects whether a fastener length, a thread distance, a number of washers, a washer thickness, one or more other type of measurement, or a combination thereof is determined by the one or more processors using a program selector. In step 76, a user triggers a measuring device with a trigger. In step 78, a motor moves the measuring device.

In step 80, information is determined using the measuring device. The information may comprise a length measurement from a beginning of a hole on a first side of a structure to either a second side of the structure at which the hole ends or to a portion of a fastener nut disposed on the second side of the structure over the hole. In other embodiments, the information may vary. Step 80 may further comprise at least one of an encoder, a linear encoder, a rotary encoder, or a sensor determining the information, using the measuring device, and converting the information into an analog or digital signal which is sent to the one or more processors. In step 82, the analog or digital signal containing the information is received with one or more processors.

In step 84, the information is processed, using instructions that are executed by the one or more processors, to determine at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener when the fastener is installed into the hole of the structure; a washer thickness for one or more washers to be used with the fastener when the fastener is installed into the hole of the structure; one or more other type of determined measurement; or any combination thereof. Step 84 may further comprise the one or more processors executing the instructions automatically using at least one predetermined algorithm.

In step 86, the determinations of the at least one processor, comprising the fastener length, the thread distance, the number of washers, the washer thickness, one or more other type of determined measurement, or any combination thereof, is outputted with an output device. In step 88, the one or more processors are wirelessly connected to an external device using at least one wireless communication device. Step 88 may further comprise wirelessly transmitting the measurement determinations, determined by the processor, from the at least one wireless communication device to the external device, or the processor receiving additional information received by the at least one wireless communication device which was transmitted from the external device. In other embodiments of the method 70, any of the steps may be modified, not followed, changed in order, or one or more additional steps may be added.

One or more embodiments of the disclosure may reduce one or more issues experienced by one or more current systems or methods by providing an automatic system which outputs the necessary fastener or washer installation measurements without the user having to calculate or subjectively determine the fastener or washer installation measurements. This may reduce user operation fatigue, may be more accurate and efficient, and may reduce the likelihood of fastener miss-installation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. An apparatus for measuring dimensions of a hole, the apparatus comprising:
   a housing;
   a handle extending from the housing;
   a trigger arranged relative to the housing and the handle, wherein the trigger is movable from an unactuated position to an actuated position;
   a motor arranged in the housing, wherein the motor operates when the trigger is moved to the actuated position;
   a movable measuring member operable to extend from the housing when the motor operates;
   an electronic measurement device operable to measure at least one movement dimension of the movable measuring member;
   a computer processor; and
   a non-transitory computer-readable storage medium having stored therein instructions that are executable by the processor to determine, based on at least one movement dimension measured by the electronic measuring device relative to a first side of the structure, at least one of: a fastener length comprising a length of a non-threaded portion of a fastener to be installed into the hole of the structure; a thread distance comprising a distance between the second side of the structure and a beginning of a fastener thread of the fastener when the fastener is installed into the hole of the structure; a number of washers to be used with the fastener when the fastener is installed into the hole of the structure; or a washer thickness for one or more washers to be used with the fastener when the fastener is installed into the hole of the structure.

2. The apparatus of claim 1, wherein the electronic measurement device comprises one of an encoder, a linear encoder, a rotary encoder, and a sensor.

3. The apparatus of claim 1, further comprising a program selector allowing a user to select whether the fastener length, the thread distance, the number of washers, the washer thickness, or any combination thereof is determined by the computer processor.

4. The apparatus of claim 1, further comprising an output device for outputting the fastener length, the thread distance, the number of washers, the washer thickness, or any combination thereof as determined by the processor.

5. The apparatus of claim 4, wherein the output device comprises at least one of a display, a visual device, or an audio device.

6. The apparatus of claim 1, further comprising at least one wireless communication device that includes at least one of a transmitter, a receiver, or a transducer.

* * * * *